United States Patent [19]
Nagy

[11] Patent Number: 5,943,058
[45] Date of Patent: Aug. 24, 1999

[54] TEXTURE MAPPING CIRCUIT FOR PERFORMING DATA INTERPOLATIONS

[75] Inventor: Michael B. Nagy, San Ramon, Calif.

[73] Assignee: Silicon Graphics, Inc., Mountain View, Calif.

[21] Appl. No.: 08/591,892

[22] Filed: Jan. 25, 1996

[51] Int. Cl.⁶ .................................................. G06T 17/00
[52] U.S. Cl. .......................................... 345/430; 345/431
[58] Field of Search ..................................... 345/419, 420, 345/421, 430, 431

[56] References Cited

U.S. PATENT DOCUMENTS

| | | | |
|---|---|---|---|
| 4,275,413 | 6/1981 | Sakamoto et al. | 358/80 |
| 5,361,386 | 11/1994 | Watkins et al. | 345/430 |
| 5,504,499 | 4/1996 | Horie et al. | 345/431 X |
| 5,557,712 | 9/1996 | Guay | 345/430 |
| 5,566,285 | 10/1996 | Okada | 345/430 |
| 5,606,650 | 2/1997 | Kelley et al. | 345/430 |
| 5,649,082 | 7/1997 | Burns | 345/430 |
| 5,740,343 | 4/1998 | Tarolli et al. | 345/430 |

OTHER PUBLICATIONS

Masao Iri, "A Method of Multi–Dimensional Linear Interpolation", Journal of the Information Processing Society of Japan, vol. 8, No. 4, 1967, pp. 211–215.

P. Haeberli & M. Segal "Texture Mapping as a Fundamental Drawing Primitive,", Fourth Eurographics Workshop on Rendering, Jun. 1993, pp. 259–266.

J. Blinn & M. Newell, "Texture and Reflection in Computer Generated Images", Communications of the ACM, vol. 19, No. 10, Oct. 1976, pp. 456–461.

*Primary Examiner*—Cliff N. Vo
*Attorney, Agent, or Firm*—Blakely, Sokoloff, Taylor & Zafman

[57] ABSTRACT

A method and apparatus for producing output values corresponding to pixels of an input image. A coordinate translation circuit for is provided for performing coordinate translation from input pixel color components to corresponding texture coordinates. The texture coordinates collectively determine a texture address. The coordinate translation circuit also generates a set of interpolation factors in one embodiment used to resample around the point in texture space defined by the texture address. An interpolation circuit is coupled to the coordinate translation circuit to receive the texture address and the set of interpolation factors. The interpolation circuit uses the texture address and the set of interpolation factors to produce an output value. Typically, the output value represents a multidimensional lookup of the color components interpolated into multidimensional space. An application of the method and device of the invention includes a color conversion method for converting input pixel color components from a source color space to a destination color space.

40 Claims, 12 Drawing Sheets

3-DIMENSIONAL DATA SET

TEXTURE MAPPING CIRCUIT FOR PERFORMING DATA INTERPOLATIONS

BACKGROUND OF THE INVENTION

1. Field of Invention

The invention relates generally to the field of computer graphics and graphics computer systems. More specifically, the invention relates to texture mapping circuits for use in graphics systems.

2. Background Information

Prior art graphics systems, including those implemented on engineering workstations, which often have a dedicated graphics subsystem, typically include texture mapping hardware. Traditionally texture mapping has been used to add realism to computer graphics images.

In its basic form, texture mapping lays an image onto an object. The image (texture image) is stored in a texture memory (texture space) addressed by (S,T,R) texture coordinates. The texture image is mapped to the object's surface by dividing the object's surface into polygons. For each polygon the vertices defined in terms of (X,Y,Z) coordinates are mapped into texture coordinates. The texture coordinates are used to index into the texture image stored in the texture memory. The known texture coordinates, derived from the polygon's vetices, are interpolated across the polygon to determine the texture image value at each of the polygon's picture elements ("pixels"). To map the texture image onto the object, the color of the object at each pixel is modified by the corresponding color from the texture image. When the polygon is viewed on the screen, a portion of the texture image is mapped onto the polygon. The end result of this texturing process is that the texture image covers the surface of the object.

While conventional texture mapping hardware performs texture interpolation, prior graphics systems have never before provided a path between input data and texture coordinates. In the past, the addresses for texture mapping would be formed by an iterator which iterates addresses along some predetermined planar slope to create the final (S,T,R) addresses. These (S,T,R) addresses are limited by the setup of the planar slope. This limitation in prior art system requires input geometry to be created before any sampling can begin with the texture image. Therefore, it is desirable to provide an apparatus and method for providing a path between input data and texture coordinates without requiring input geometry to be generated. It is also desirable to provide applications for this method and apparatus, such as color conversion, special effects like displacement addressing, and resampling along nonlinear surfaces using the method and apparatus of the present invention.

SUMMARY OF THE INVENTION

A texture mapping circuit is disclosed which produces output values corresponding to pixels of an input image. The apparatus of the present invention in one embodiment includes a coordinate translation circuit for performing coordinate translation from input pixel color components to corresponding texture coordinates. Taken together, the texture coordinates collectively represent a texture address. The coordinate translation circuit also generates a set of interpolation factors in one embodiment used to resample around the point in texture space defined by the texture address. The apparatus of the present invention further includes an interpolation circuit which is coupled to the coordinate translation circuit to receive the texture address and the set of interpolation factors. The interpolation circuit uses the texture address and the set of interpolation factors to produce an output value. Typically, the output value represents a multidimensional lookup of the color components interpolated into multidimensional space.

The method of the present invention in one embodiment operates on texture mapping hardware having a coordinate translation circuit and an interpolation circuit coupled to the coordinate translation circuit. The method of the present invention includes the steps of receiving the color components of a pixel from an input image. The coordinate translation circuit then translates the color components to corresponding texture coordinates, and a set of interpolation factors. The method of the invention then performs interpolation using the texture address defined by the texture coordinates and the set of interpolation factors to produce an output value. Typically, the output value represents a multidimensional lookup of the color components interpolated into multidimensional space.

The present invention includes applications of the method and device of the invention, such as a color conversion method. This method is practiced in a computer system having a device of the invention including a texture mapping circuit comprising a coordinate translation circuit coupled to a bus, and a texture map memory. The method converts input pixel color components from a source color space to a destination color space. The method includes the step of receiving input pixel color components from an input image. Then the method translates the input pixel color components into texture coordinates that define a point in the texture map memory. The method then produces an output value by retrieving one or more values from the texture map memory.

The present invention also includes a method of producing special effects. This method is practiced in a computer system having a device of the invention including a texture mapping circuit comprising a coordinate translation circuit coupled to a bus, and a texture map memory. The method converts an original image stored in the texture map memory to a modified output image using input pixel components containing displacements. The method includes the step of receiving the displacements from an input image. Then the method translates the displacements into texture coordinates that define a point in the texture map memory. The method then produces an output value by retrieving one or more values from the texture map memory.

The present invention further includes a method for following data contours in multi-dimensional space. This method is practiced in a computer system having a device of the invention including a texture mapping circuit comprising a coordinate translation circuit coupled to a bus, and a texture map memory. The method maps input texture coordinates to the surface of a target image stored in the texture map memory. The method includes the step of receiving the input texture coordinates from an input image. Then the method translates the input texture coordinates into texture coordinates that define a point in the texture map memory. The method then produces an output value by retrieving one or more values from the texture map memory.

DETAILED DESCRIPTION OF THE INVENTION

Figure 1:
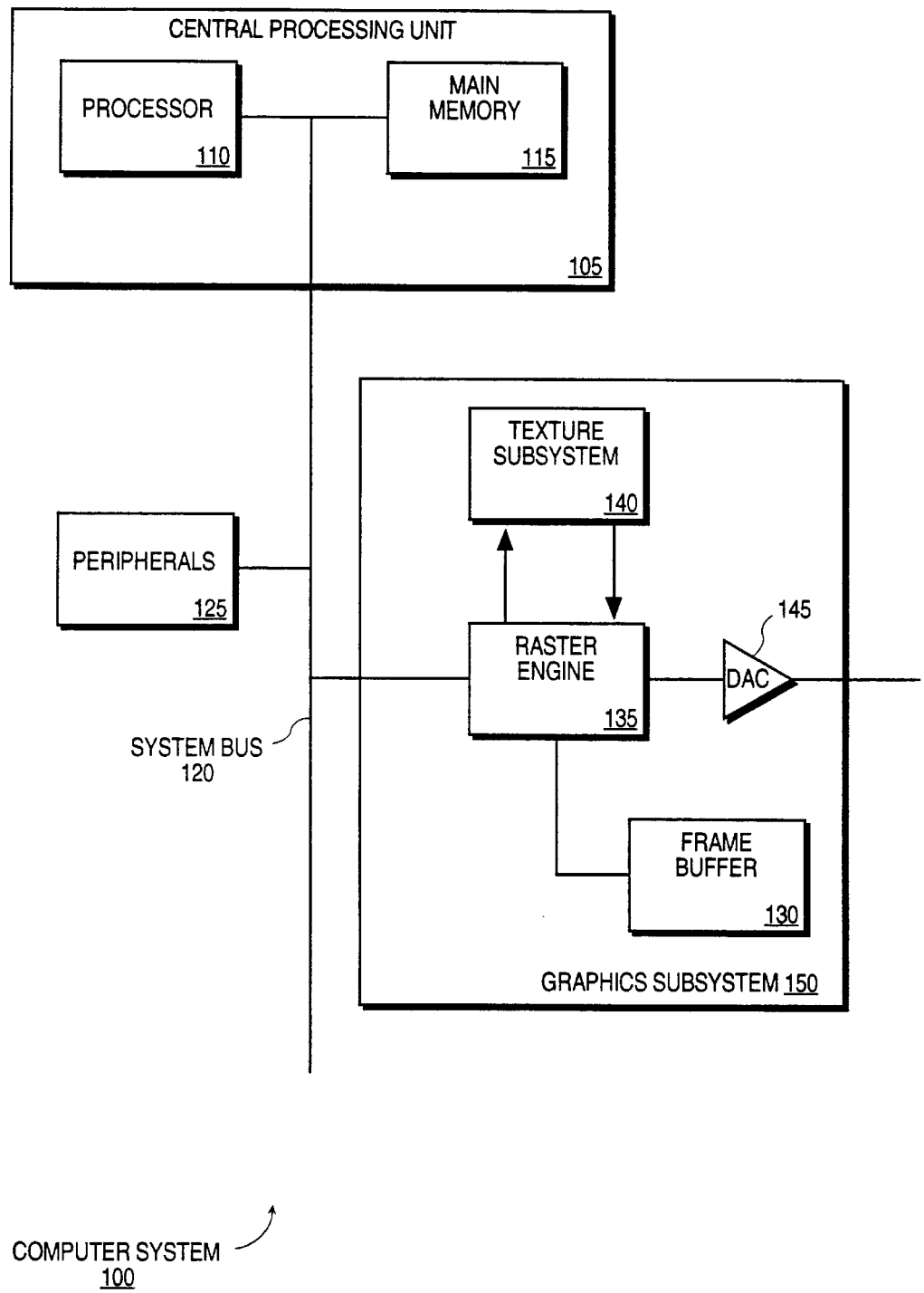
FIG. 1 shows an example of a system architecture of the present invention.

The subject invention will be described with reference to numerous details set forth below and the accompanying drawings which illustrate the invention. The following description is illustrative of the invention and is not to be construed as limiting the invention. Numerous specific details are described to provide a thorough understanding of the present invention. However, in other instances, certain well known or conventional details are not described in order to not unnecessarily obscure the present invention in detail. In the drawings, the same element is labeled with the same reference numeral.

FIG. 1 shows the system architecture in a computer system 100 of the present invention. This high level system architecture is similar to architectures found in computer systems of the prior art. As shown in FIG. 1, a central processing unit (CPU) is coupled to a system bus 120. The system bus 120 is further coupled to peripherals 125, which may include a printer, a modem, a keyboard, a mouse, a hard drive, a CD-ROM, etc. (not shown), and a graphics subsystem 150. The CPU 105 includes a processor 110 and a main memory 115 coupled to one another and the system bus 120. The graphics subsystem 150 comprises a raster engine 135, a texture subsystem 140, a frame buffer 130, and a digital to analog converter (DAC) 145. The raster engine 135 is coupled to the system bus 120 for receiving primitives such as lines and polygons specified in terms of their endpoints (vertices). The raster engine 135 scan-converts primitives into component pixels. The raster engine 135 is further coupled to the texture subsystem 140, the frame buffer 130, and the DAC 145. Traditionally, the graphics subsystem 150 would process information destined for a display device, such as a CRT or liquid crystal display device. In addition, however, according to one embodiment, the texture subsystem 140 produces information that can be used for other than display purposes. If the results are for display they will be stored in the frame buffer 130 to be scanned out and displayed on a display device (not shown). However, if the results are for other than display (e.g. RGB to CMYK color conversion) then the information produced by the texture subsystem 140 may be sent back to the CPU 105 for further processing or storage. In addition to the traditional functions performed by prior art texture hardware, the present invention takes advantage of powerful existing resampling hardware to add flexibility to the use of the texture subsystem 140 to perform processing typically limited to software or specialized color processing hardware.

One embodiment of the device of the present invention will now be described with reference to FIG. 2a. The texture subsystem 140 depicted includes a texture mapping circuit 245. The texture mapping circuit 245 comprises a data to texture coordinate translator 200 and an interpolation circuit 210. The data to texture coordinate translator 200 further comprises a texture coordinate translation circuit 205, a data buffer 215, an alpha bit selection circuit 240, and a control register 275. The texture coordinate translation circuit 205 is coupled to the data buffer 215 and the control register 275. The data buffer 215 buffers the input data (e.g. input pixel color components) received from the raster-engine-texture-engine bus (RETEbus). In this embodiment, the input data comprises an R input color component 206, a G input color component 207, a B input color component, and an A input color component 209. The texture coordinate translation circuit 205 transforms the input data, in accordance with control fields in the control register 275, into a texture address 236 and interpolation factors 237 for use by the interpolation circuit 210. The interpolation circuit 210, as discussed in more detail later, produces an A interpolated texture output component 280, an R interpolated texture output component 285, a G interpolated texture output component 290, and a B interpolated texture output component 295.

The alpha bit selection circuit 240 is coupled to the data buffer 215 to receive the A input color component 209. The alpha bit selection circuit 240 is further coupled to the control register 275 for receiving control information. The alpha bit selection circuit 240 allows different bits to be selected from the A input color component 209. For example, when performing a 2-pass 4-dimensional lookup table (LUT) operation, it is desirable to have the ability to select either the most significant (MS) 8 bits of the A input color component 209 or the least significant (LS) 8 bits of the A input color component 209. The alpha bit selection circuit 240 is further coupled to a tristate buffer 255. The tristate buffer 255 is coupled to an alpha replace enable line 265 which is set by the AREPLACE_EN control field in the control register 275. The AREPLACE_EN control field 265 is further coupled to a second tristate buffer 260 through an inverter 250. Therefore, depending on the state of the AREPLACE_EN control field 265, either the tristate buffer 260 or the tristate buffer 255 will be enabled. Thus, the AREPLACE_EN control field 265 effectively chooses between the A interpolated texture output component 280 from the interpolation circuit 210 and the bits selected from the A input color component 209 by the alpha selection circuit 240 for output to the texture interface 296.

In this embodiment, the input color components can be represented with up to twelve bits and the resulting output texture coordinates are represented with eighteen bits (with the exception of the R texture coordinate 230). The output texture coordinates include an S texture coordinate 220, a T texture coordinate 225, and an R texture coordinate 230. The S texture coordinate 220 is comprised of an integer portion 310 and a fractional part 315 (discussed further with respect to FIG. 3b). The T texture coordinate 225 is also comprised of an integer portion 320 and a fractional part 325. The integer portions (310 and 320), in this embodiment, are represented by twelve bits and the fractional parts (315 and 325) are represented by six bits. The control register 275 contains control fields, described below in Table 1, for indicating the allocation of the input color component bits between the output texture coordinate integer portion and fractional part. This allocation is programmable, as will be discussed later.

TABLE 1

Control Register 275

| Control Field | Description |
|---|---|
| LUT_ENABLE | Enables multi-dimensional LUT capabilities. |
| AREPLACE_EN | When enabled, the fourth input color component (the A input color component 209) is routed to the texture interface and the output of the tristate buffer 260 is tri-stated.<br>When disabled, the alpha component of the texture comes from the interpolation circuit's alpha output (the A interpolated output component 280) and the data to texture coordinate translator's alpha output is tri-stated |
| RINT_BITS | Specifies the Log base 2 of the size of the S texture dimension being used. |
| GINT_BITS | Specifies the Log base 2 of the size of the G texture dimension being used. |
| BINT_BITS | Specifies the Log base 2 of the size of the LOD texture dimension being used. |
| AINT_BITS | Specifies the Log base 2 of the size of the fourth texture dimension being used. |
| A_RND_MODE | Specifies the rounding that is to be done on the A input color component 209 when it is to be routed through the alpha bit selection circuit 240.<br>Rounding modes include:<br>0 - Round to the nearest integer by adding 0.5 and taking floor<br>1 - Take floor(A)<br>2 - Take ceiling(A)<br>3 - No rounding, A is not modified |
| A_LSREP | When the A input color component 209 is an 8 bit input, this field specifies whether the LS 4 bits of the 12 bit output are set to zero or replicated from the MS 4 bits of the 8 bit alpha value.<br>When the A input color component 209 is a 12 bit input, either the LS 8 bits are used (as an 8 bit input would) or this bit is a don't care based on the A12_LS_SELECT field below and all of the bits are routed to the data to texture coordinate translator 200 alpha output |
| RGB_LSREP | Specifies what to do with the least significant S, T and LOD interpolation bits when there are not enough bits in the incoming pixel value to map all of the interpolation bits (e.g. 6 for S and T, 5 for LOD).<br>In one state, the most significant integer bits of the incoming data value are replicated into the least significant interpolation bits.<br>In another state, the least significant interpolation bits are set to zero. |
| A12_LS_SELECT | When enabled, the Ls 8 bits of the 12 bit A input component 209 are routed to the MS 12 bits of the data to texture coordinate translator's alpha output and the LS 4 bits are processed according to the A_LSREP field above. This allows the fractional portion of the A input color component 209 to be used in producing the blend factor in the 4-dimensional interpolated case.<br>When disabled, the 12 bit value is routed to the data to texture coordinate translator's alpha output. This field has no effect when using an 8 bit A input color component 209. |
| SLICE_PAGES | Specifies the Log base 2 of the number of pages in each slice. |
| VOL_PAGES | Specifies the Log base 2 of the number of pages in each 3-dimensional data set. |

The control fields described in Table 1 help direct the operation of the texture coordinate translation circuit 205. For example, the control register 275 includes a plurality of control fields including RINT_BITS, GINT_BITS, and BINT_BITS. The RINT_BITS control field indicates the number of most significant bits to be selected from the R input color component 206 for the integer portion 310 of the S texture coordinate 220. The GINT_BITS control field indicates the number of most significant bits to be selected from the G input color component 207 for the integer portion 320 of the T texture coordinate 225. The BINT_BITS control field indicates the number of most significant bits to be selected from the B input color component 208 for the page1 and page2 outputs. In this example, the number of fractional bits used for a given texture coordinate will depend on the number of integer bits allocated to the texture coordinate's integer portion. The least significant bits remaining in a given input color component after the integer bits have been selected for the corresponding texture coordinate's integer portion will be used as that texture coordinate's fractional part. For example, if the RINT_BITS control field is eight, then the eight most significant bits of the R input color component 206 will be selected for the S texture coordinate's integer portion 310, leaving four potential remaining bits for the S texture coordinate's fractional part 315.

The control register 275 further includes a control field, RGB_LSREP, that indicates what action is to be taken when not enough bits remain once the integer bits have been extracted from the R, G, and B input color components. In one state, if there are less than six interpolation bits remaining, the most significant bits of the input color component are replicated into the least significant bits of the fractional part of the corresponding texture coordinate. In another state, the least significant bits of the fraction part of the corresponding texture coordinate are simply set to zero. Should the number of fractional bits exceed six, the six most significant bits are used and the rest are discarded.

Prior texture mapping operations typically require input geometry to be created to begin sampling the texture image. Also, the results produced by prior texture mapping operations are normally used solely for display purposes. An advantage of the preferred embodiment, as shown in FIGS. 1 and 2a, is texture mapping functions can be performed by dedicated hardware on a pixel by pixel basis without requiring input geometry to be generated. Further, the results can be sent to the display or routed back to the CPU 105 for further processing or storage. The present invention provides the ability to convert input image color components into texture coordinates that can use resampling hardware to create an output value; thus, allowing one-to-one, multidimensional lookup of color components interpolated into multidimensional space to create an output sample.

Figure 2A:
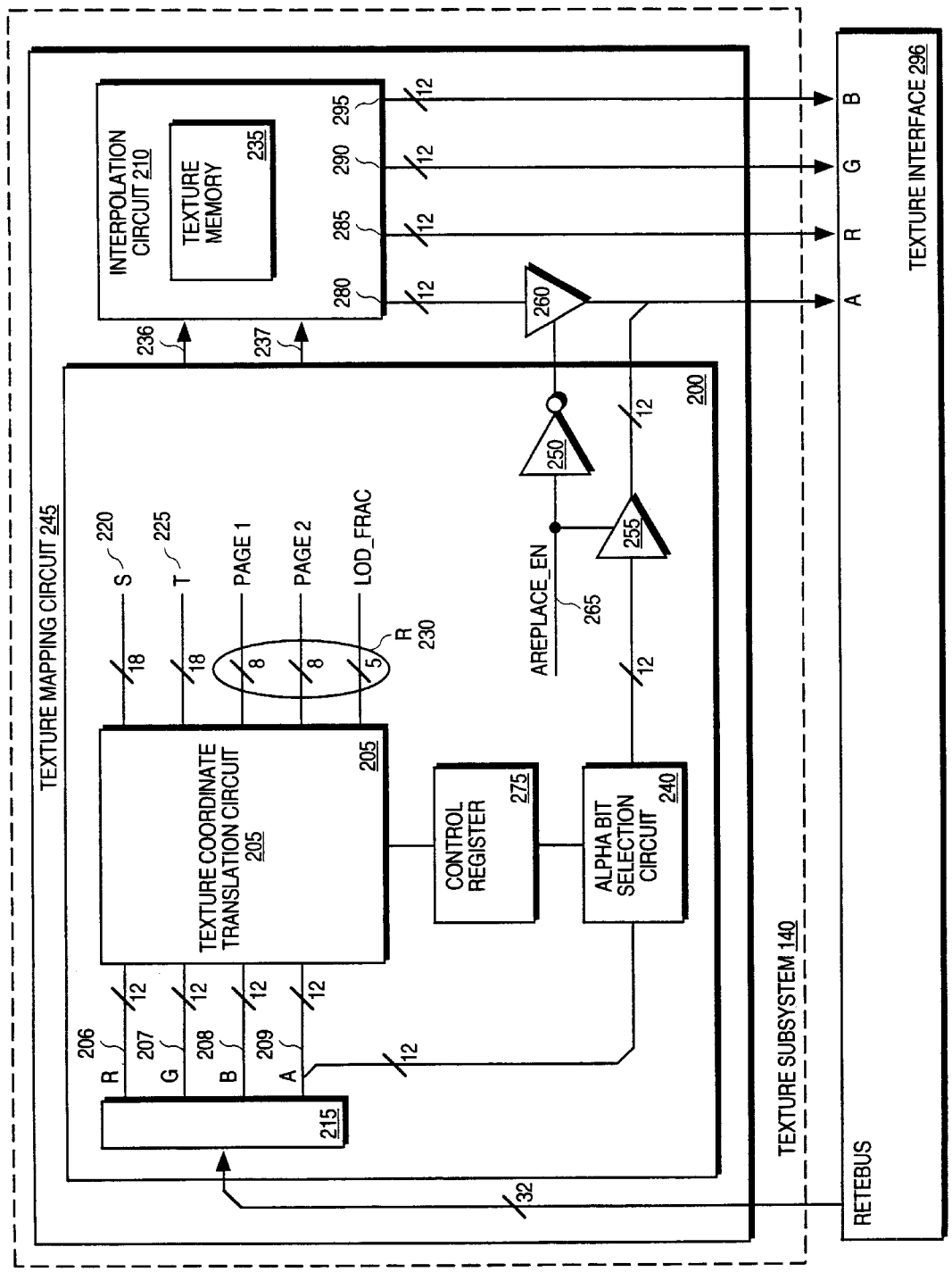
FIG. 2a is a block diagram of the device of the present invention.
Figure 2B:
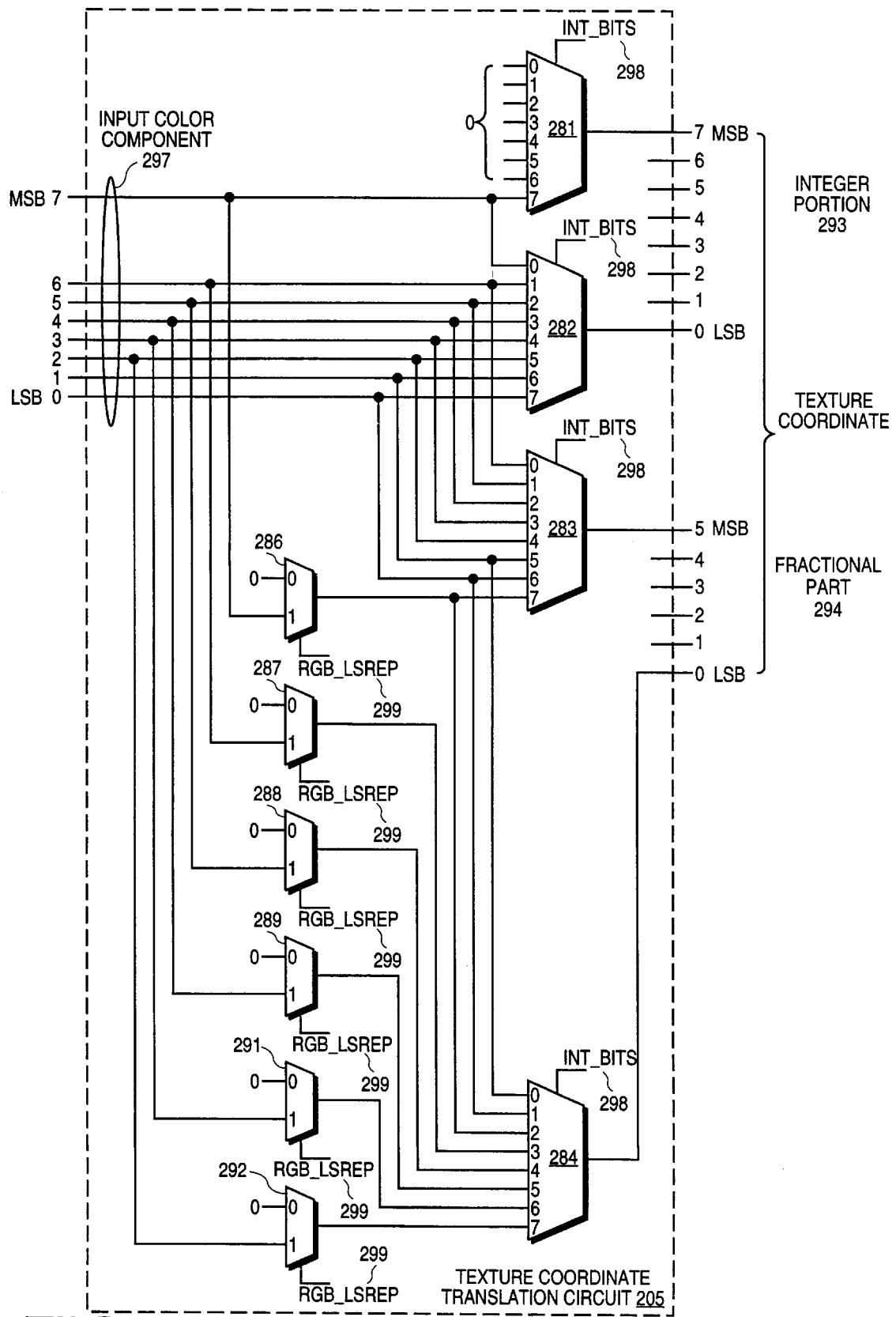
FIG. 2b illustrates register level components of a texture coordinate translation circuit.

FIG. 2b illustrates a partial embodiment of the texture coordinate translation circuit 205 with respect to one input color component 297 using multiplexers. According to the embodiment depicted, the texture coordinate translation circuit 205 includes a plurality of multiplexers configured by control fields in the control register 275 to select a portion of the input data for integer addressing the texture memory 235 and to select a portion of the input data for performing interpolation. This eight bit example illustrates one method of mapping the bits of the input color component 297 (C[0 . . . 7]) to the bits of an integer portion 293 (I[0 . . . 7]) and the bits of a fractional part 294 (F[0 . . . 7]). For simplicity, only the most significant bit (MSB) and the least significant bit (LSB) of the integer portion 293 are shown. Likewise, only the MSB and the LSB of the fractional part 294 are shown. From this example, the manner of determining the rest of the intermediate bits of the integer portion 293 and the fractional part 294 will be apparent to those skilled in the art.

Selection of the bits for the integer portion 293 can be accomplished with eight multiplexers, in this example. Selection of the MSB and LSB of the integer portion 293 will now be discussed. Multiplexer (MUX) 281 is coupled to the input color component's MSB, C[7], and an INT_BITS input 298. INT_BITS, in this example, is used in a similar manner as one of the "INT_BITS" fields in the control register 275 (e.g. RINT_BITS, GINT_BITS or BINT_BITS) except that the INT_BITS input 298 indicates one less than the number of bits that are to be selected from the 8 bit input color component 297. Therefore, in this example, at least one bit will be selected from the 8-bit input color component 297 for the integer portion 293. The INT_BITS input 298 selects the MSB for the integer portion 293, I[7], from MUX 281. MUX 282 is coupled to C[0 . . . 7] and the INT_BITS input 298. The INT_BITS input 298 selects the LSB for the integer portion 293, I[0], from MUX 282. In this example, C[7] will be routed to I[7] if the value the INT_BITS input 298 is seven. When the INT_BITS input 298 is seven all the input color component 297 bits are allocated to the integer portion 293 and I[0 . . . 7] will be equal to C[0 . . . 7]. At the other extreme, when the INT_BITS input 298 is zero only one bit of the input color component 297 is allocated to the integer portion 293 and I[1 . . . 7] will be set to zero and I[0] will be set to C[7]. The intermediate bits of the integer portion 293 are determined in a similar manner.

Selection of the bits for the fractional part 294 can be accomplished with eleven multiplexers, in this example. Selection of the MSB and LSB of the fractional part 294 will now be discussed. MUX 283 is coupled to input color component 297 bits C[0 . . . 6], the output of MUX 286 and an RGB_LSREP input 299. The INT_BITS input 298 selects the MSB for the fractional part 294, F[5], from MUX 283. MUX 284 is coupled to input color component 297 bits C[0] and C[1] as well as the outputs of multiplexers 286, 287, 288, 289, 291, and 292 and the INT_BITS input 298. The INT_BITS input 298 selects the LSB for the fractional part 294, F[0], from MUX 284. In this example, the RGB_LSREP input acts like the RGB_LSREP control field in the control register 275. In one state, the MS bits of the input color component 297 are replicated into the LS bits of the fractional part 294 that remain unfilled and in another state the MS bits are not replicated. When the INT_BITS input 298 is seven and the RGB_LSREP input 299 is zero, all the bits of the input color component 297 are allocated to integer addressing. Additionally, the MS bits of the input color component 297 are not replicated and F[0 . . . 5] is set to all zeros. However, if the INT_BITS input 298 is seven and the RGB_LSREP input 299 is one, the MS bits of the input color component 297 are replicated and F[0 . . . 5] is set equal to C[2 . . . 7]. At the other extreme, when the INT_BITS input 298 is zero and the RGB_LSREP input 299 is zero, only one bit of the input color component 297, C[7], is allocated to integer addressing. The next six MS bits of the input color component 297, C[6 . . . 1], are routed to F[5 . . . 0] and C[0] will be discarded. Similarly, if the INT_BITS input 298 is zero and the RGB_LSREP input 299 is one F[0 . . . 5] is set equal to C[1 . . . 6] and C[0] is discarded. The intermediate bits of the fractional part 294 are determined in a similar manner.

The multiplexer example, above, is only one of many possible functional equivalent implementations of the texture coordinate translation circuit 205. Other implementations include the use of gate level logic, programmable logic arrays (PLAs), or implementing the reduced logic equations for each output bit of the texture coordinate translation circuit 205 in a hardware definition language (HDL).

The device of FIG. 2a provides modes including (1) 3-dimensional interpolated LUT, (2) 3-dimensional interpolated LUT with modulation of the resultant color value, (3) Near 4-dimensional interpolated LUT, and (4) 4-dimensional interpolated LUT. Each of these modes will now briefly be described.

(1) 3-dimensional interpolated LUT

In this mode, the incoming pixel's color components (206–208) are converted to S, T, and R texture coordinates. The R input color component 206 maps to the S texture coordinate 220, the G input color component 207 maps to the T texture coordinate 225 and the B input color component 208 maps to the R texture coordinate 230. The R texture coordinate 230 is the level of detail ("LOD") dimension. In this embodiment, each "slice" of the LOD dimension represents a different dynamic random access memory (DRAM) page. Like ordinary LODs, these slices alternate between memory groups (e.g. g1 and g2). In this mode of operation, address shifting by greater than one between LOD levels is disabled. Each slice of the LOD dimension can contain more than one DRAM page if the size of S×T is larger than a single DRAM page. However, if the size of S×T is smaller than a page, the slice is lower-left justified to (0,0) of the page. The texture address 236 defined by the integer portions of the S, T, and R texture coordinates, determines a 3-dimensional texture volume 555 in the texture memory 235.

This mode can also be used for 2-dimensional and 1-dimensional lookup table (LUT) operations. For example, the input image could contain (S,T) addresses. Thus, each input pixel would hold the mapping from the input image to that pixel's location in the output image. This method of displacement addressing can be used to create special effects like warping or brush stroke type effects. Displacement addressing is discussed further in relation to FIG. 7.

(2) 3-dimensional interpolated LUT with modulation of the resultant color value

In this mode, the R, G, and B color components are used as in (1) above, but the A input color component 209 ("K" in the CMYK case) is substituted for the A interpolated texture output component 280 (the alpha result of the texture mapping operation). If the AREPLACE_EN control field is one, the A input color component 209, as modified by the alpha bit selection circuit 240, is output by the data to texture coordinate translator 200 as the texture alpha to the texture interface 296. This allows, for example, the "K" value to modulate the CMY to RGB result. This can be accomplished, for example, by setting the A input color component 209 to 1.0 and the input RGB colors to 0.0, which results in the A input color component 209 being used to blend between black and the interpolated texture color.

(3) Near 4-dimensional interpolated LUT

Setting the A_RND_MODE field to zero in the control register 275 selects this mode, which causes rounding to the nearest integer value. The mapping of the R, G, and B input color components (206–208) is the same as the 3-dimensional case. However, the A input color component 209 is used in this mode to create a DRAM page offset within the fourth dimension. The size of the fourth dimension is set by the AINT_BITS field in the control register 275. Therefore, in this mode, there is a variable number of 3-dimensional data sets (one for each integer value of the fourth input component). In this mode, the nearest 3-dimensional data set is selected and is trilinearly interpolated to create the output as in (1) above. The nearest 3-dimensional data set is selected by rounding the fourth dimension input value (e.g. A or K) to the nearest integer (e.g. floor(A+0.5)). In this mode, the A input color component 209 should be scaled to Q-size-1 in range and not biased. For example, if there are sixteen integer Q locations, the A input color component 209 should be scaled to have a range of 0 to 14.99.

(4) 4-dimensional interpolated LUT

In this mode, there are two steps, a 2-pass operation is used. The A input color component 209 should be scaled as in (3) above. Each pass is similar to (3) above. However, in the first pass, floor(A) is used as the fourth dimension index to select the first 3-dimensional data set in which to perform the trilinear interpolation. Further, the result of the first pass is stored in the frame buffer 130. Also, in the second pass, floor(A)+1 is used as the fourth dimension index to select the second 3-dimensional data set. Finally, the fractional portion of the A input color component 209 is used to create the source alpha, blending (in the frame buffer 130) the second pass results with the results of the first pass. This allows interpolation between the results of two 3-dimensional trilinear interpolations on the two 3-dimensional data sets that straddle the fractional portion of the A input color component 209. Therefore, allowing for full quad-linear interpolation.

The above modes are merely illustrative of the capabilities of the device of FIG. 2a and not meant to be an exhaustive list of functions.

Figure 3A:
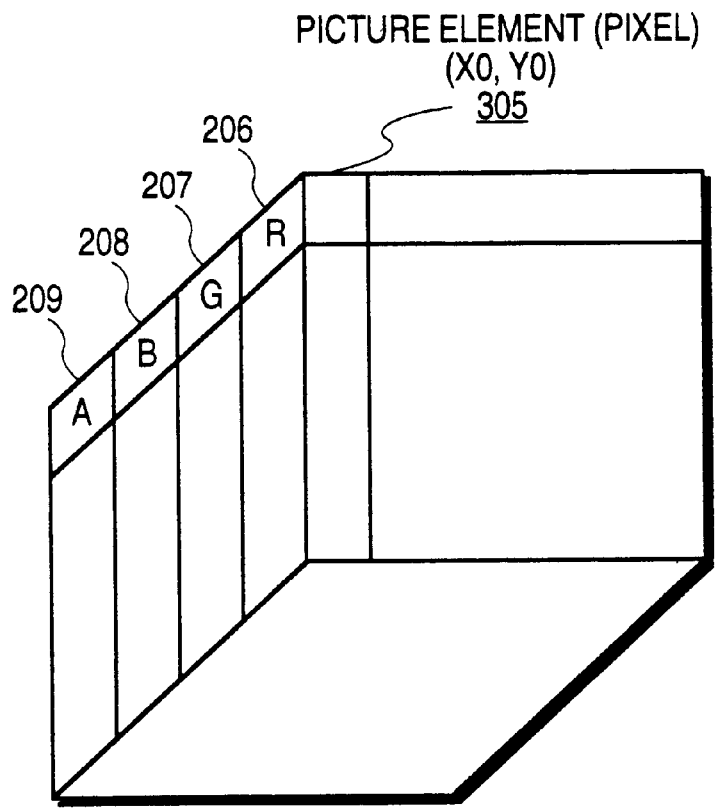
FIG. 3a illustrates an input image in main memory.

FIG. 3a illustrates the input image in main memory 115. The input image contains a pixel 305 at location $X_0$, $Y_0$ stored as part of the input image in CPU main memory 115. The pixel 305, in this illustration, has color components red (R) 206, green (G) 207, blue (B) 208, and alpha (A) 209.

Prior to operating the texture logic of the present invention, the user will typically specify a lookup table (LUT) and store the LUT in the texture memory 235. Further, it is assumed the user will also have caused an input image to be loaded into main memory 115.

Figure 3B:
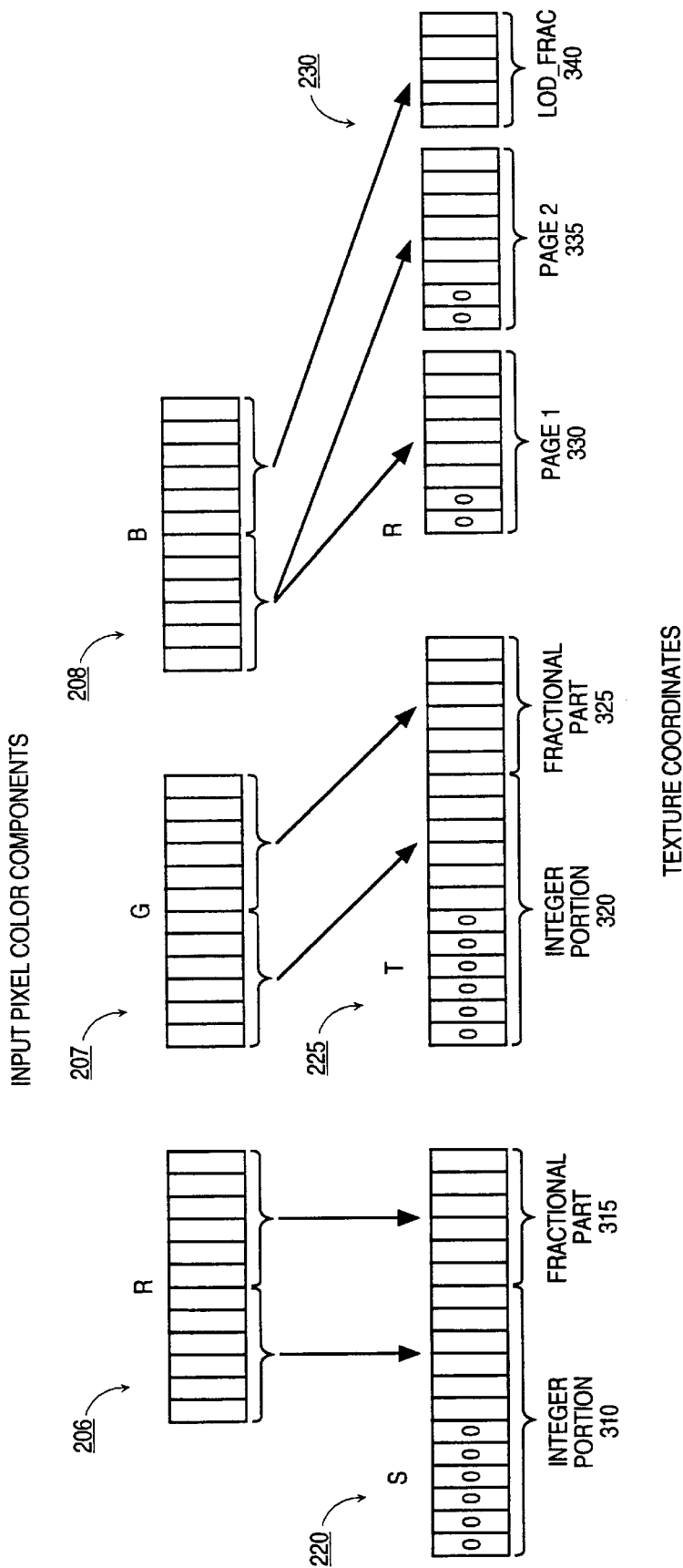
FIG. 3b illustrates the transformation of a single input pixel's color components to a corresponding set of texture coordinates.

FIG. 3b illustrates the transformation of a single input pixel's color components to a corresponding set of texture coordinates. The texture coordinates, in this example, define the texture address 236 and interpolation factors 237 for 1, 2 or 3-dimensional LUT operations. The texture address 236 is determined by an integer portion 310 of the S texture coordinate 220, an integer portion 320 of the T texture coordinate 225, page1 330, and page2 335. A start page in a first slice is determined by multiplying the integer portion of the B input color component by the number of pages per slice. A start page in a second slice is determined by multiplying the integer portion of the B input color component plus one by the number of pages per slice. The resulting texture address 236 is used by the interpolation circuit 210 for integer addressing the texture memory 235. The interpolation factors 237 include a fractional part 315 of the S texture coordinate 220, a fractional part 325 of the T texture coordinate 225 and a LOD fraction 340 for linearly interpolating between the first and second memory groups. The interpolation factors 237 are used by the interpolation circuit 210 along with the texture address 236 to produce the interpolated texture output components 280, 290, 295, and 296 based upon values retrieved from the LUT as explained further below.

FIG. 3b shows one of the many possible allocations of input color component bits. In this example, the R, G, and B input color components (206–208) are each represented by twelve bits, six bits from each input color component are allocated for integer addressing (e.g. RINT_BITS, GINT_BITS, and BINT_BITS are all six) and the remaining six bits are allocated for interpolation. Six of the R input color component's most significant bits are selected for the least significant six bits of the integer portion 310 of the S texture coordinate 220. The remaining most significant bits of the integer portion 310 will be set to zero. The six remaining least significant bits are selected for the fractional part 315 of the S texture coordinate 220. Similarly, six of the G input color component's most significant bits are selected for the least significant six bits of the integer portion 320 of the T texture coordinate 225. The remaining most significant six bits of the integer portion 320 will be set to zero. The six remaining least significant bits are selected for the fractional part 325 of the T texture coordinate 225. Finally, six of the B input color component's most significant bits are selected for the least significant six bits of page1 330 and the same bits are selected for the least significant six bits of page2 335. The most significant two bits of both page1 330, and page2 are set to zero. The remaining six least significant bits of the B input color component 208 are selected for the lod_frac 340 the least significant of which is discarded. The A input color component 209 acts as an offset in the fourth texture dimension which will be discussed further with respect to FIG. 5b.

Many other combinations of input color component bit allocations are possible. The number of bits allocated to the integer portion of a given texture coordinate, and hence the number of bits used for integer addressing the texture memory 235 is programmable. The number of bits used for integer memory addressing versus linear interpolation is determined per input image component based on the size of the corresponding dimension of the LUT loaded in the texture memory 235. The number of upper bits used for integer addressing of a given texture dimension can be determined by taking the log base 2 of the size of the LUT in the corresponding dimension. For example, eight upper bits of each color component would be used for integer addressing a 64×64×64 LUT stored in texture memory 235. Therefore, if the user specifies and loads a 64×64×64 LUT into the texture memory 235, then the RINT_BITS, GINT_BITS, and BINT_BITS control fields in the control register will be set to eight.

Figure 4:
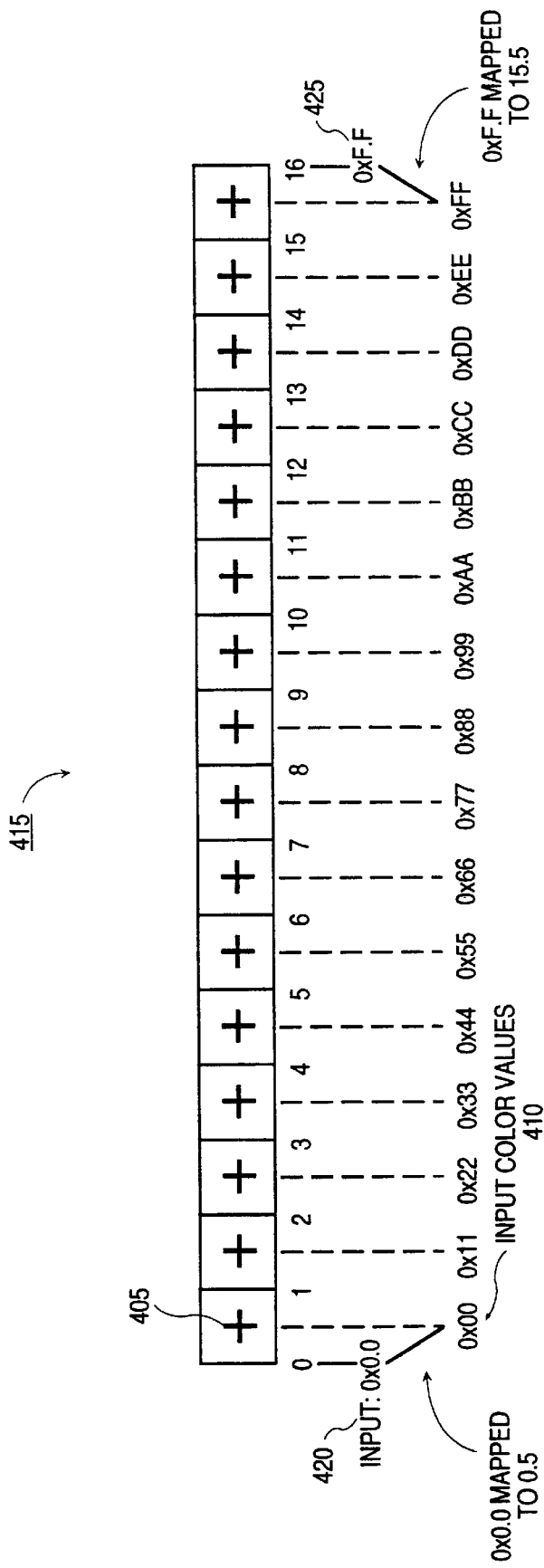
FIG. 4 illustrates scaling/biasing for mapping input data to texture coordinates.

FIG. 4 illustrates how input data (e.g. input color values 410) can be scaled and biased to map the input data to texture element ("texel") centers 405. The input data, used as pixel addresses, assume that texels have integer addresses at their centers. However, texels have integer addresses at their edges. The scaling and biasing as provided by the equations below shrink and translate the input data range, allowing integer input values to map to texel centers. Therefore, it is desirable to perform scaling and biasing on all input pixel components that are to be used as texture coordinates. Scaling and biasing is performed prior to translating the input data to texture coordinates and can be performed by the CPU 105 using the equations below. FIG. 4 illustrates a one dimensional example of how scaling/biasing is accomplished assuming a sixteen element LUT 415 and eight bit input color values 410 with four bits allocated to the integer portion of the output texture coordinate and four bits allocated to the fractional part of the output texture coordinate (e.g. four bits are allocated for integer addressing and the remaining four bits are allocated for interpolation). In this example, the radix is located between the fourth and the fifth bits. The first bit below the radix, the MSB of the fractional part has a value of ½ ($2^{-1}$), the next bit to the right of the radix represents a fractional value of ¼ ($2^{-2}$), the third bit of the fractional part has a value of ⅛ ($2^{-3}$), and the LSB has a value of 1/16 ($2^{-4}$). The following equations express how scaling and biasing are performed:

$$TEXCOORD = C_{input}(\text{scale}) + \text{bias} \quad \text{(Equation 45)}$$

$$TEXCOORD = C_{input}\left(\frac{\text{size}-1}{\text{size}-2^{-n}}\right) + (2^{n-1} + 0.5) \quad \text{(Equation 46)}$$

Where $C_{input}$ represents the input color component, size is the size of the corresponding dimension of the LUT as stored in the texture memory 235, n is the number of bits of $C_{input}$ that are allocated as fraction bits, and TEXCOORD is the resulting texture coordinate. In equation 45, the bias is a fractional value added to the scaled input color component. Therefore, in this example, the $2^{n-1}$ component in equation 46, represents adding an MSB to the fractional part (e.g. ½). The 0.5 component of the bias in equation 46 represents adding one half of the fractional part's LSB. Consequently, in this example, the 0.5 component of the bias represents 1/32. However, if only two bits of the input color component were allocated to the fractional part of the output texture coordinate, then the 0.5 component of the bias would represent adding ⅛ ($2^{-3}$). Thus, referring to FIG. 4, an input 420 of 0x00 (zero) is mapped to 0x08 (one half) and an input 425 of 0xFF (sixteen minus one sixteenth) is mapped to 0xF8 (fifteen and one half).

Figure 5A:
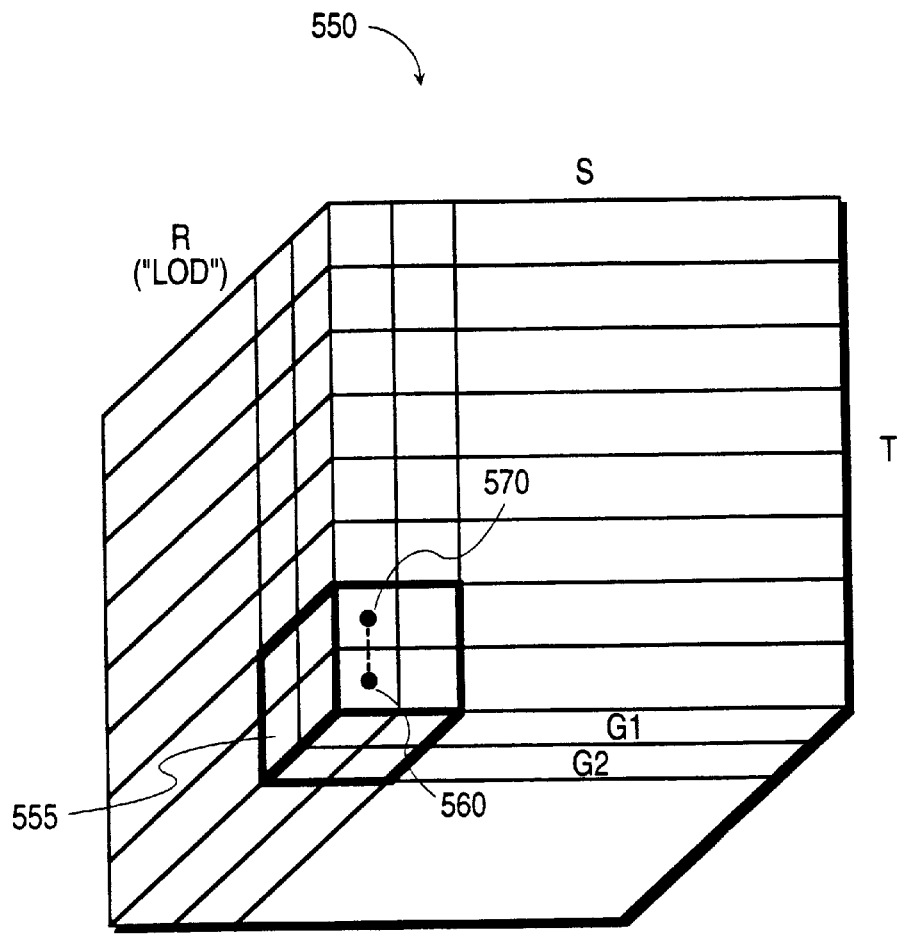
FIG. 5a illustrates a texture volume in a 3 dimensional data set.

FIG. 5a shows a 3D data set 550 within the texture memory 235 having three dimensions S, T, and R. The texture address 236 input to the interpolation circuit 210 defines a point 560 within the 3D data set 550. A texture volume 555 (a 2×2×2 interpolation solid), in turn, can be identified by the point 560. In this embodiment, the point 560 identifies the lower, left, front location of the texture volume 555. For example, if the point 560 were at location (0,0,0) in the texture memory 235, the texture volume 555 would be comprised of texture memory locations (0,0,0), (0,0,1), (0,1,0), (0,1,1), (1,0,0), (1,0,1), (1,1,0) and (1,1,1). An interpolation point 570 is found by adding the interpolation factors 237 to the point 560. Several well known interpolation methods are available for producing the interpolated texture output components 280, 285, 290, 295 given the interpolation point 570 and the texture volume 555. One method may be preferable over another depending upon the accuracy of the results required, timing constraints, or other factors. Two known interpolation methods are briefly discussed with respect to FIGS. 6a, 6b, and 6c.

Figure 5B:
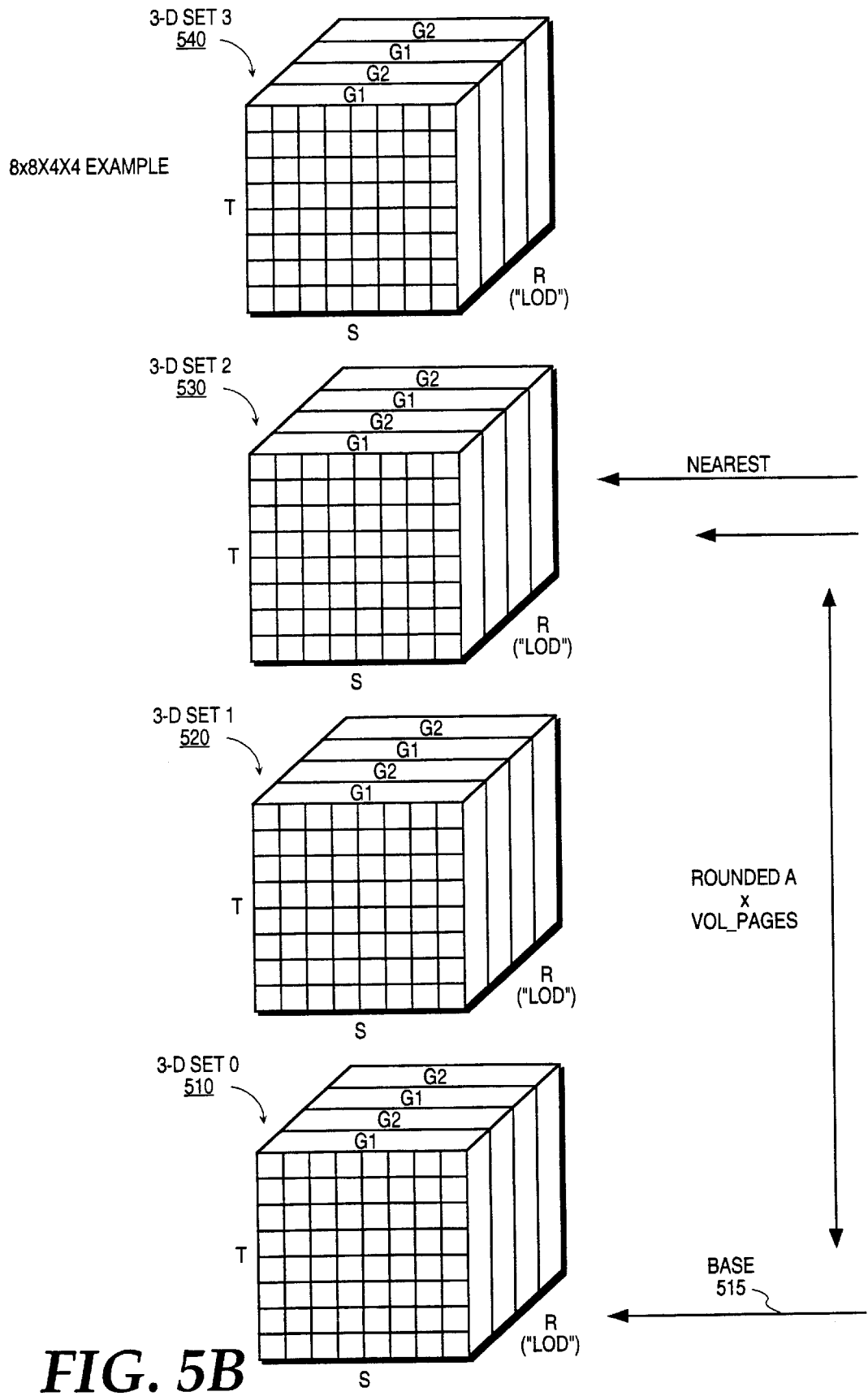
FIG. 5b illustrates the selection of a 3 dimensional data set for 4 dimensional LUT operations.

FIG. 5b illustrates an example of how a 3-dimensional data set may be chosen for 4-dimensional LUT operations according to one embodiment of the present invention. In this example, the R input color component 206 is mapped to the S texture coordinate 220 as in the 3-dimensional case, the G input color component 207 is mapped to the T texture coordinate 225 as in the 3-dimensional case, the B input color component 208 is mapped to the R texture coordinate 230 as in the 3-dimensional case; however, the A input color component 209 is now used to create a DRAM page offset. As described in Table 1, the AINT_BITS field in the control register 275 specifies the log base 2 of the size of the fourth dimension being used. In this example, there are four 3-dimensional data sets 510, 520, 530 and 540; therefore, two integer bits are used from the A input color component 209 to select a 3-dimensional data set to be used for trilinear interpolation. In the near 4-dimensional interpolated LUT mode, the A input color component 209 is rounded to the nearest integer to create a rounded result. The rounded result can be used to determine an index in the fourth texture dimension. The rounded result multiplied by the VOL_PAGES control field in the control register 275 added to a base 515 (which is the offset for the entire set of 3-dimensional data sets) locates the start of one of the 3-dimensional data sets. In this example, the 3-dimensional data set 530 is selected for trilinear interpolation. In the 4-dimensional interpolated LUT mode, the two 3-dimensional data sets that straddle the input fractional A value will both individually be trilinearly interpolated and then the results will be interpolated providing full quadlinear interpolation. For example, the 3-dimensional data set 520 would be selected for the first pass and the 3-dimensional data set 530 would be selected for the second pass.

Figure 6A:
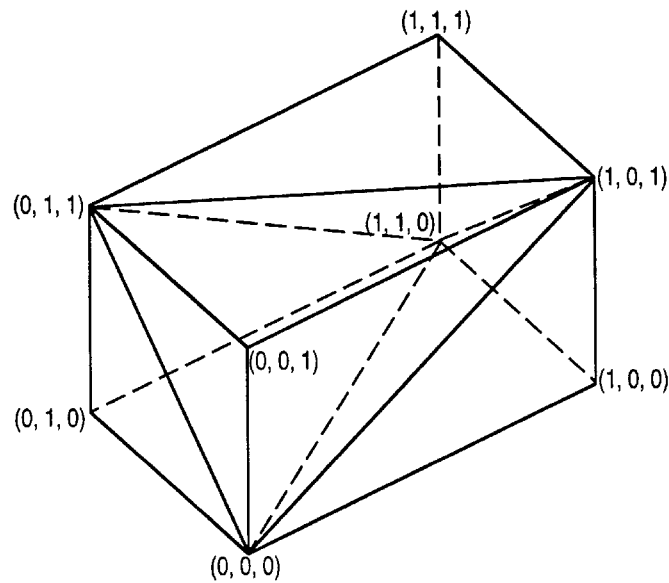
FIG. 6a illustrates an example of how a texture volume can be partitioned into five simplexes.
Figure 6A:
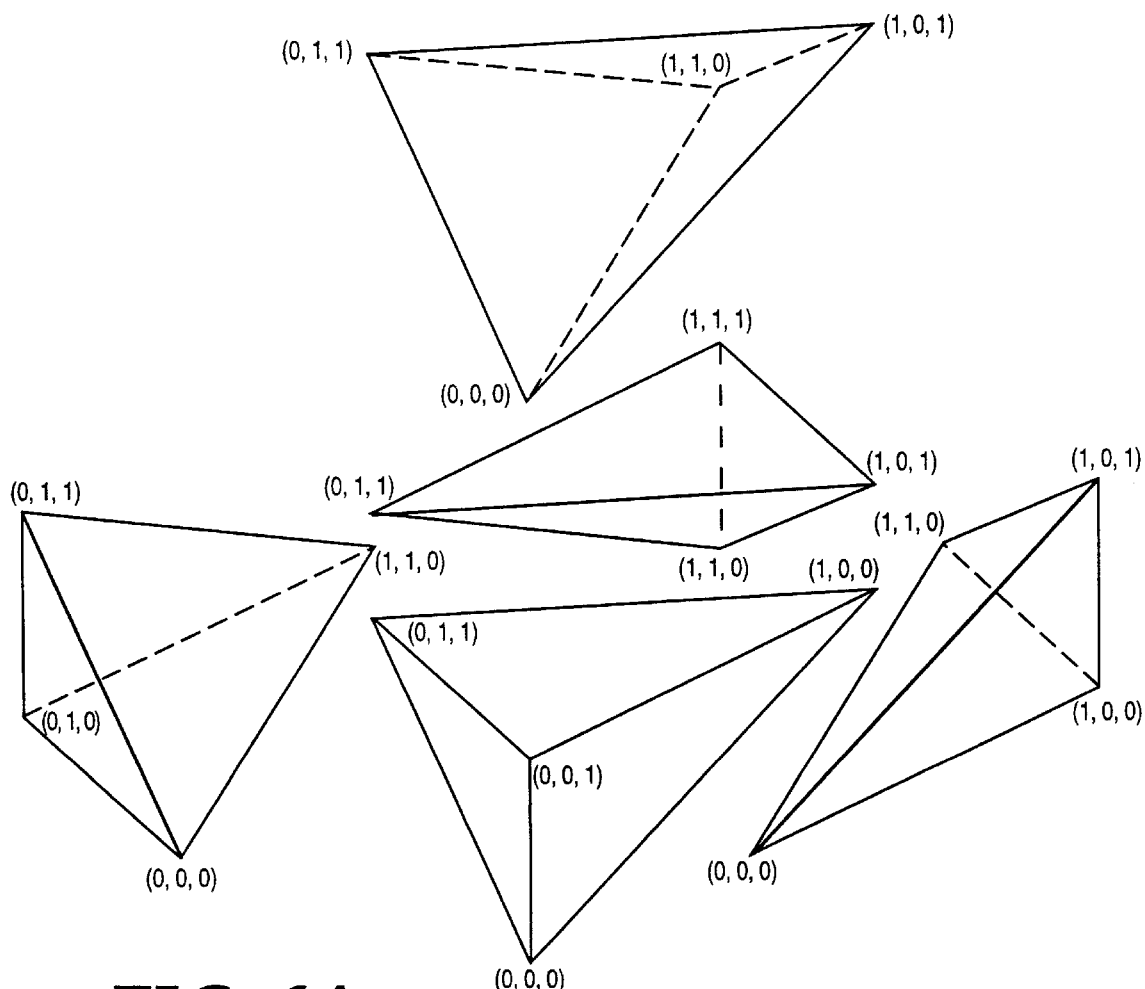
Figure 6B:
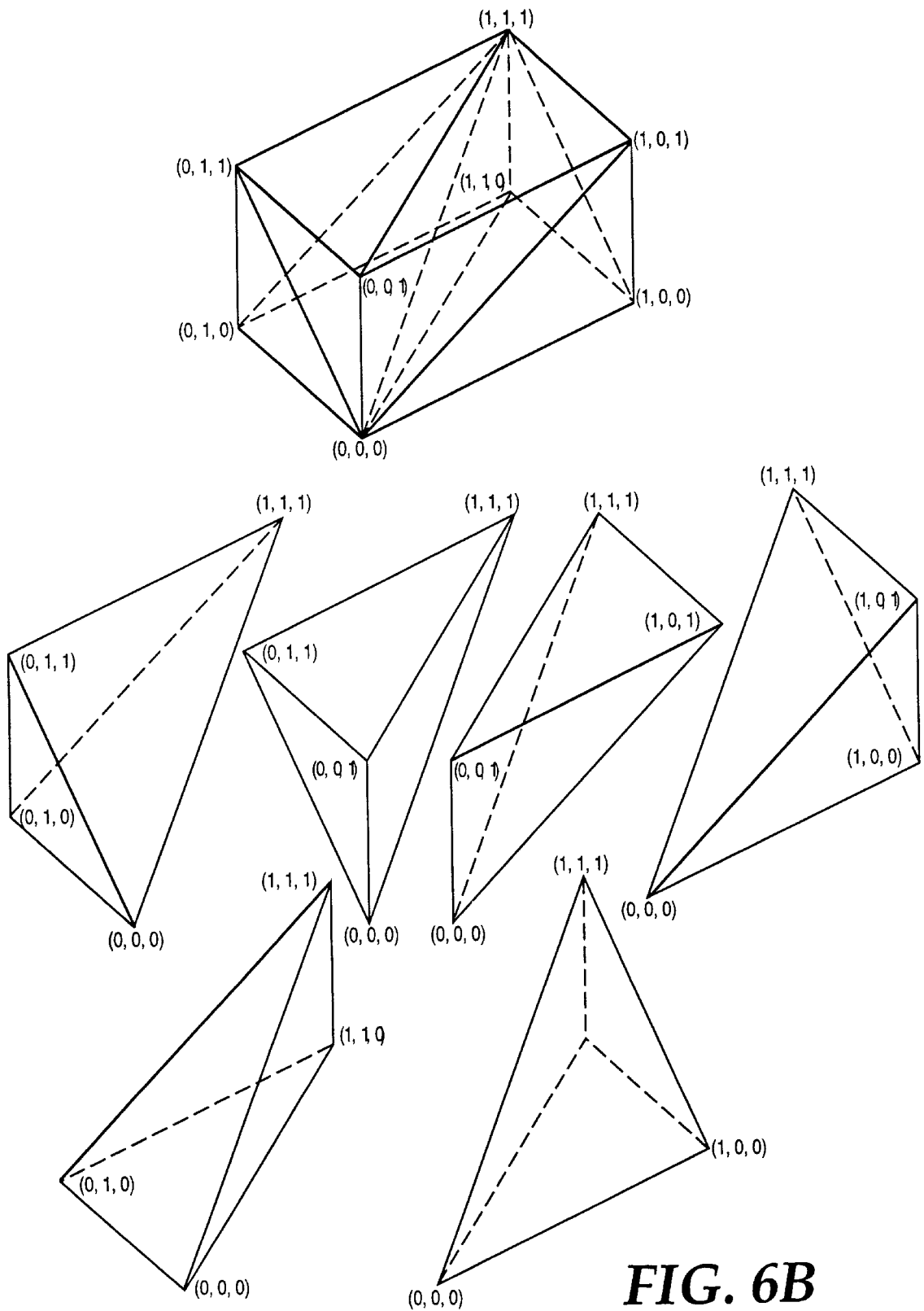
FIG. 6b illustrates an example of how a texture volume can be partitioned into six simplexes.

FIGS. 6a and 6b illustrate two different partitions of a three-dimensional cube, representing the selected texture volume 555, into five and six simplexes respectively. Using one of the many well known methods of performing linear interpolation, interpolated results, representing the weighted mean of the four vertices of the simplex containing the interpolation point 570, can be obtained. One such method is described in Joho Shori (the Journal of the Information Processing Society of Japan), Vol. 8, No. 4 (1967), pp. 211–15.

Figure 6C:
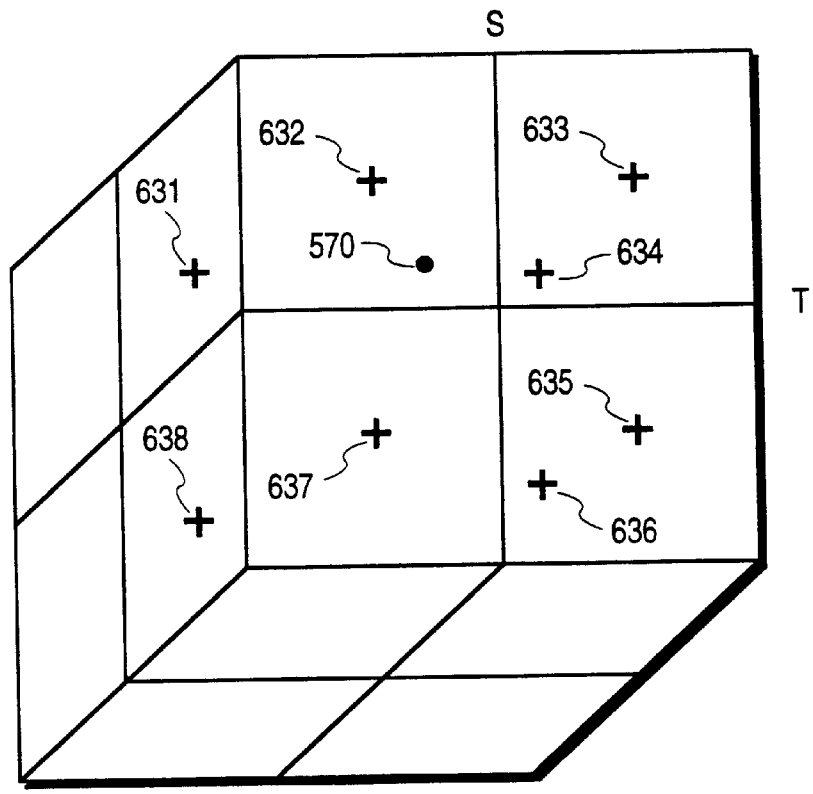
FIG. 6c illustrates an example of how the weighted mean of eight points can be used to produce interpolated results.

FIG. 6c illustrates an example of how the weighted mean of eight points can used to produce the required interpolated results. Instead of using the four vertices of a simplex as described in Joho Shori, the eight texel centers (631, 632, 633, 634, 635, 636, 637 and 638) can be used. The weighted mean of the values stored in the LUT entries contained in the selected texture volume 555 are determined in a known way. The weight given to a given LUT entry is based on the proximity of the interpolation point 570 to the corresponding texel center. The weighted mean of the values stored in the selected eight LUT entries are determined and output as the interpolated texture output components 280, 285, 290 and 295.

Several applications of the present device and method will now be described. One application of the device and method of the present invention involves color conversion and will be described with reference to FIG. 7. It is assumed that the user has specified a customized LUT for the desired color conversion. Similarly, it is also assumed the user has stored the LUT in the texture memory 235 and that an input image is stored in the main memory 115. The method begins at step 705 where the a set of input pixel color components are received. Scaling and biasing are performed, step 710. The scaling/biasing function essentially shrinks and shifts the input color component range to map to the corresponding texture coordinate dimension size. The scaling/biasing for each dimension of the LUT is independent of the other dimensions and is performed separately for each color component using equation 46. Processing then continues to step 715 from 710.

At step 715, the texture coordinate translation circuit 205 selects the number of bits indicated by the RINT_BITS control field in the control register 275 from the most significant bits of the input pixel's R color component 206 for the integer portion 310 of the S texture coordinate 220. Other means will be apparent to those in the art to perform this selection. For example, in a software implementation, a masking operation could be performed instead of a selection performed by a MUX as illustrated in FIG. 2b. At step 720, the remaining least significant bits of the input pixel's R color component 206 are selected by the translation circuit for the fractional part 315 of the S texture coordinate 220. If not enough fractional bits remain to fill the fractional part 315 of the S texture coordinate 220, this step would include replicating the MS bits of the input into the LS bits of the fractional part 315 or setting them to zero, depending on the state of the RGB_LSREP field in the control register 275.

Next processing proceeds to step 725 in which the number of bits indicated by the GINT_BITS control field is selected by the texture coordinate translation circuit 205 from the most significant bits of the input pixel's G color component 207. In this step, these most significant bits are used for the integer portion 320 of the T texture coordinate 225. In step 730, the remaining least significant bits of the input pixel's G color component 207 are used for the fractional part 325 of the T texture coordinate 225. Like step 720, this step would include filling the fractional part 325 with zeros or replicated MS bits of the G input color component 207 under the appropriate circumstances.

Processing then proceeds to step 735 where the texture coordinate translation circuit 205 selects the number of bits indicated by BINT_BITS control field in the control register 275 from the most significant bits of the input pixel's B color component 208 for the DRAM page. Next, at step 740, the texture coordinate translation circuit 205 uses the remaining least significant bits of the input pixel's B color component 208 for lod_frac. Again, when required, the lod_frac LS bits will be filled with zeros or replicated MS bits of the incoming data value.

At step 745, the interpolation circuit 210 selects a texture volume (interpolation solid) 555 using the texture address defined by the integer portions selected from the R, G, and B pixel's color components. The texture volume 555 comprises the eight locations defining a 2×2×2 cube containing the texture address 236 in the lower, left, front corner. Step 750 generates the final result by producing the interpolated texture output components 280, 285, 290, and 295. The interpolation circuit 210 performs trilinear interpolation within the texture volume 555 determined in step 745. In this step, the fractional parts selected from the pixel's R, G, and B color component are applied to the point 560 defined by the texture address 236 to arrive at an interpolation point 570. One of the known multi-dimensional linear interpolation methods (e.g. the methods discussed with respect to FIGS. 5b and 5c) can be applied to produce the interpolated texture output components 280, 285, 290, 295. At step 755, if there are more pixels to be processed in the input image, the process will continue to step 715.

An advantage of the described color conversion method is that the user can supply a customized LUT representing, for example, a particular printing process for a nonlinear color space transform like RGB to CMYK With the described method a user can build the entire nonlinear printing process into a table (e.g. characterizing the paper, press, etc.), load the table into texture space, and then have a way of converting an RGB to a CMYK value that, when printed on paper using the printing process characterized in the LUT, would look like the RGB color displayed on the screen. The LUT is loaded as a normal texture map would be loaded into texture memory 235 supplying the number of input components (texture dimensionality) and the size of each texture dimension. For example, in OpenGL the "TexImage3D" call would be used. Conversions from RGB to CMYK and other color spaces (e.g. CMY, HSV, LUV, LHS, LAB, and YUV) and from other color spaces to RGB are well known. Therefore, it is well known how to create an appropriate conversion table; however, a path has never existed from input pixel color components to texture space to make the described color conversion method feasible prior to the device of the present invention.

Figure 7:
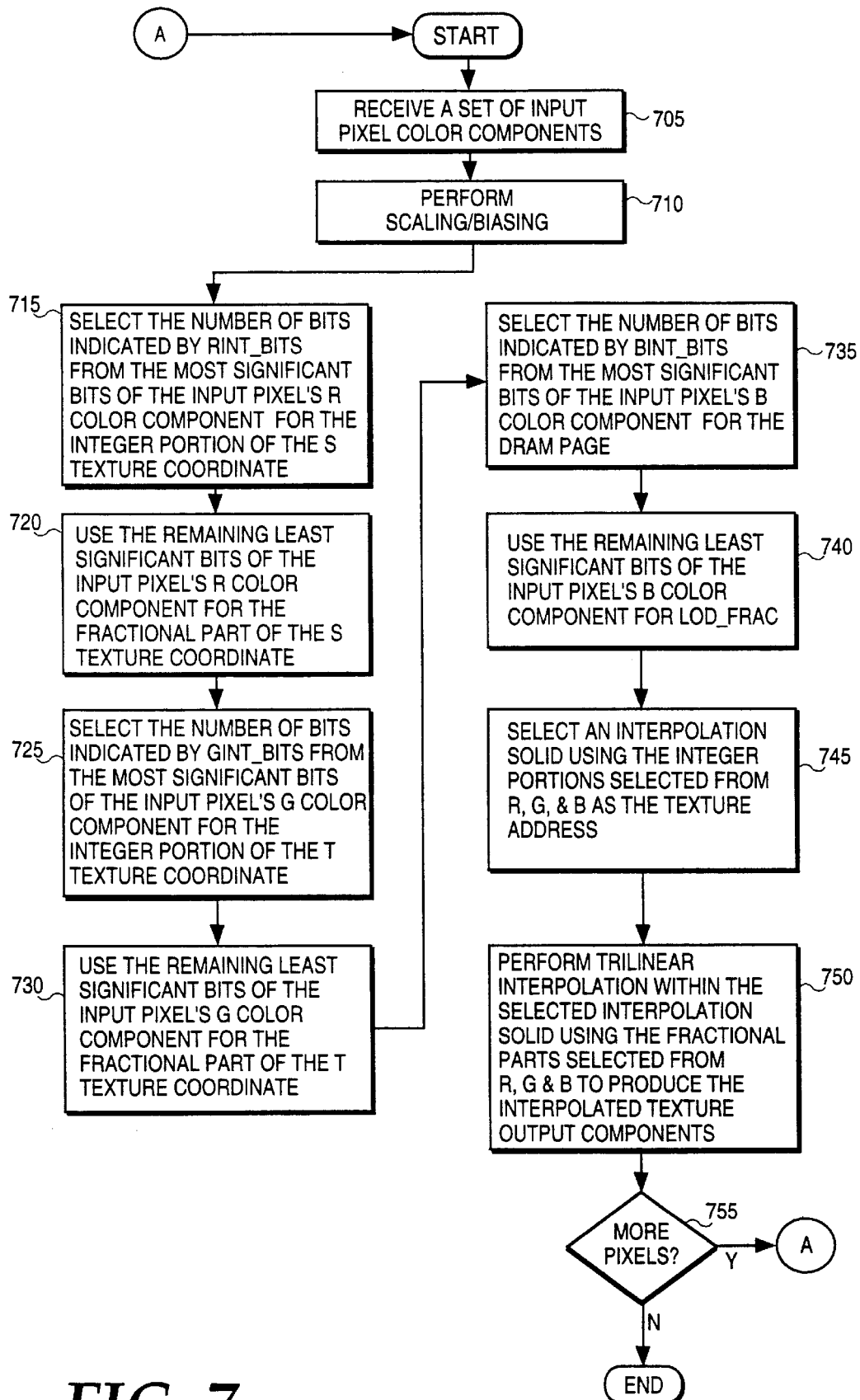
FIG. 7 is a flow diagram illustrating one embodiment of a color conversion method according to the method and device of the invention.

The generalized flow of FIG. 7 is also applicable to a method of performing special effects (e.g. displacement addressing). However, instead of loading an LUT for color conversion into the texture memory 235, as above, the user would load the input image that is to be modified into the texture memory 235. Further, the pixel color components in main memory 115 would contain the mapping (displacement) to the input pixel's location in the output image. The pixel components can be set to (S,T) displacements appropriate for the desired effect. For example, to flip the input image about the horizontal axis the top, left corner pixel would contain the (S,T) location of the bottom, left corner of the input image, the top, right corner pixel would contain the (S,T) location of the bottom, right corner of the input image, and so on. This method can be used to create special effects including brush stroke effects and other very weird warps.

The steps of FIG. 7 can also be applied to perform a method of following data contours in multidimensional space. The image containing the surface data to be scanned is loaded into the texture memory 235, and main memory 115 is initialized to contain a list of texture coordinates for the desired surface coordinates. What ends up on the display, for example, is the image of the surface with the input texture coordinates interpolated and shown as intensity on that surface. In the past, one would have had to take every location on the surface and convert it into a primitive and draw that primitive and resample the texture. This method allows one to simply store the coordinates that are to be resampled and when those coordinates are processed by the device of FIG. 2a the desired values are output.

It will be appreciated that the methods described in conjunction with FIG. 7 may be used with the circuitry shown in FIG. 2a as well as with other circuit implementations of the present invention. Moreover, the methods may be used in a general purpose computer which implements the method in software without any special purpose hardware.

Many other uses are available for the device of the present invention. The user is free to create LUTs for any application and the device of the present invention provides the mechanism for hardware accelerating the process once the appropriate LUT is generated and stored in the texture memory 235. The foregoing invention has been described with reference to certain specific details, logic circuits and processing steps which were presented for a thorough understanding of the invention. It will be appreciated that numerous modifications and applications may be made of the present invention without departing from the spirit and scope of the claims which follow.

What is claimed is:

1. An apparatus for use in a graphics system, said apparatus producing output values corresponding to input pixels, each input pixel having n color components, where n is >=1, each output value representing the result of an n-dimensional lookup of said color components, said apparatus comprising:

a bus which provides said color components;

a coordinate translation circuit coupled to said bus for receiving said color components, said coordinate translation circuit configured to perform coordinate translation from said color components to corresponding texture coordinates that collectively determine a texture address; and a texture map memory coupled to said coordinate translation circuit, said texture map memory having stored therein a lookup table (LUT).

2. The apparatus of claim 1, wherein said texture address is used to index into said LUT, wherein said coordinate translation circuit also generates a set of interpolation factors, and further comprising an interpolation circuit coupled to said coordinate translation circuit, said interpolation circuit performing interpolation using said texture address and said set of interpolation factors to produce said output values.

3. The apparatus of claim 2, wherein one or more of said color components are scaled and biased prior to being received by said coordinate translation circuit.

4. The apparatus of claim 2, wherein said texture address defines one or more interpolation solids, said interpolation is a trilinear interpolation and said trilinear interpolation takes place within one of said interpolation solids.

5. The apparatus of claim 2, wherein said color components include a first color component comprising a predetermined number of upper bits corresponding to the size of a corresponding dimension of said LUT and a number of remaining lower bits, wherein said texture coordinates include a first texture coordinate comprising an integer portion, said coordinate translation circuit configured to select said predetermined number of upper bits from said first color component for said integer portion of said first texture coordinate, said coordinate translation circuit further configured to select said number of remaining lower bits for use as one of said set of interpolation factors.

6. The apparatus of claim 3, wherein said color components are scaled and biased using the following equation:

$$TEXCOORD = C_{input}\left(\frac{size-1}{size-2^{-m}}\right) + (2^{m-1} + 0.5),$$

wherein $C_{input}$ represents one of said color components, TEXCOORD represents the resulting texture coordinate corresponding to $C_{input}$, size is the size of the corresponding dimension of said LUT as stored in the texture memory, m is the number of said remaining lower bits of $C_{input}$.

7. A texture mapping circuit for use in a graphics system, said texture mapping circuit transforming input pixel data into a corresponding texture address, said texture address used for addressing a lookup table (LUT), said texture mapping circuit comprising:
 a data to texture coordinate translator for receiving said input pixel data, said data to texture coordinate translator configured to transform said input pixel data to said corresponding texture address; and
 a texture memory coupled to said data to texture coordinate translator, said texture memory having stored therein said LUT.

8. The texture mapping circuit of claim 7, wherein said texture address is determined by a set of texture coordinates, each of said texture coordinates includes an integer portion and a fractional part, said data to texture coordinate translator further comprising:
 a texture coordinate translation circuit configured to generate said integer portions and said fractional parts, said integer portions collectively determining said texture address, said texture address defining a point in said texture memory for determining a texture volume containing a portion of said LUT, said fractional parts collectively representing a set of interpolation factors.

9. The texture mapping circuit of claim 8, wherein said texture mapping circuit further comprises:
 an alpha bit selection circuit for receiving a portion of said input pixel data, said alpha bit selection circuit configured to produce an alpha output; and
 an interpolation circuit coupled to said data to texture coordinate translator, said interpolation circuit using said texture address and said interpolation factors to generate interpolated output values from said portion of said LUT, wherein said texture mapping circuit can be configured to substitute said alpha output for a corresponding interpolated output value of said interpolation circuit.

10. A method, for use with a texture mapping circuit, for producing output values corresponding to pixels of an input image, each pixel having n components, said texture mapping circuit comprising a coordinate translation circuit coupled to a bus, and an interpolation circuit coupled to said coordinate translation circuit and said bus, said method comprising the steps of:
 said coordinate translation circuit receiving said components;
 said coordinate translation circuit converting said components to a texture address and a set of interpolation factors; and
 said interpolation circuit interpolating values retrieved from a texture memory to produce said output values.

11. The method of claim 10, wherein said texture address is used to index into a lookup table (LUT) stored in said texture memory, and said LUT having dimensions corresponding to said components.

12. The method of claim 11, said method further comprising the steps of scaling and biasing one or more of said components that are used as texture coordinates prior to said step of converting said components to a texture address and a set of interpolation factors.

13. The method of claim 11, wherein said texture address defines one or more interpolation solids within said texture memory, and said step of interpolating values retrieved from a texture memory is accomplished by performing trilinear interpolation within one of said interpolation solids.

14. The method of claim 11, wherein each of said components comprises a number of upper bits and a number of remaining lower bits, wherein said step of converting said components further comprises the steps of:
 selecting said number of upper bits from each of said components, said number of upper bits corresponding to the size of the corresponding dimension of said LUT, said number of upper bits representing one of said texture coordinates; and
 selecting said number of remaining lower bits from each of said components, said number of remaining lower bits representing one of said set of interpolation factors.

15. A color conversion method, for use with a texture mapping circuit, for converting input pixel color components from a source color space to a destination color space, said color conversion method producing an output value in said destination color space representing the result of a multidimensional lookup of said input pixel color components interpolated into multidimensional space, said texture mapping circuit comprising a coordinate translation circuit coupled to a bus, and a texture map memory, said method comprising the steps of:
 receiving said input pixel color components from an input image;
 translating said input pixel color components into texture coordinates that define an address in said texture map memory; and
 retrieving one or more values from said texture map memory to produce said output value.

16. The color conversion method of claim 15, wherein said source color space is RGB and said destination color space comprises one of CMY, CMYK, HSV, LUV, LHS, LAB, or YUV.

17. The color conversion method of claim 15, wherein said source color space comprises one of CMY, CMYK, HSV, LUV, LHS, LAB, or YUV and said destination color space is RGB.

18. The color conversion method of claim 15, wherein said texture map memory has stored therein a lookup table (LUT), said LUT contains values from said destination color space, and said address is used to index into said LUT.

19. The color conversion method of claim 18 wherein:

said LUT has a dimension corresponding to each of said input pixel color components, each of said texture coordinates comprises an integer portion and a fractional part, and said step of translating includes selecting a predetermined number of bits from said input pixel color components for said integer portion and using a remaining number of bits from said input pixel color components for said fractional part, said predetermined number of bits based upon the size of the corresponding dimension of said LUT.

20. The color conversion method of claim 19 wherein:

said step of translating includes performing scaling and biasing using the following equation:

$$TEXCOORD = C_{input}\left(\frac{size-1}{size-2^{-n}}\right) + (2^{n-1} + 0.5),$$

wherein $C_{input}$ represents one of said input pixel color components, TEXCOORD represents the resulting texture coordinate corresponding to $C_{input}$, size is the size of the dimension of the LUT corresponding to the input pixel color component, $C_{input}$, and n is the number of said remaining lower bits of $C_{input}$.

21. The color conversion method of claim 19 wherein said texture mapping circuit further comprises an interpolation circuit coupled to said coordinate translation circuit and said step of retrieving further comprises the steps of:

said interpolation circuit selecting a texture volume within said texture memory using said address, said address defined by the integer portions of said texture coordinates;

said interpolation circuit determining an interpolation point using said address and the fractional portions of said texture coordinates; and said interpolation circuit resampling around said interpolation point within said texture volume.

22. The color conversion method of claim 21 wherein said texture volume is a 2×2×2 cube and said address defines the lower, left, front location of said texture volume; and said step of resampling includes performing trilinear interpolation using the interpolation point and eight points within said texture volume.

23. A method of producing special effects, for use with texture mapping circuit, converting an original image stored in a texture map memory to a modified output image using input pixel components containing displacements, said method of producing special effects generating an output value determined from said original image and said displacements, said output value representing the result of a multidimensional lookup of said displacements interpolated into multidimensional space, said texture mapping circuit comprising a coordinate translation circuit coupled to a bus, and said texture map memory, said method comprising the steps of:

receiving said displacements from an input image;

translating said displacements into texture coordinates that define an address in said texture map memory; and retrieving one or more values from said texture map memory to produce said output value.

24. The method of claim 23, wherein said texture map memory has stored therein a lookup table (LUT), said LUT contains said original image, and said texture coordinates are used to index into said LUT.

25. The method of claim 24 wherein:

said LUT has a dimension corresponding to each of said displacements, each of said texture coordinates comprises an integer portion and a fractional part, and said step of translating includes selecting a predetermined number of bits from said displacements for said integer portion and using a remaining number of bits from said displacements for said fractional part, said predetermined number of bits based upon the size of the corresponding dimension of said LUT.

26. The method of claim 25 wherein prior to said step of translating said displacements are scaled and biased.

27. The method of claim 25 wherein said texture mapping circuit further includes an interpolation circuit coupled to said coordinate translation circuit and said step of retrieving further comprises the steps of:

said interpolation circuit selecting a texture volume within said texture map memory using said address, said address defined by the integer portions of said texture coordinates;

said interpolation circuit determining an interpolation point using said address and the fractional portions of said texture coordinates; and said interpolation circuit resampling around said interpolation point within said texture volume.

28. A method for following data contours in multidimensional space, for use with a texture mapping circuit, mapping input texture coordinates to the surface of a target image stored in a texture map memory, said method producing an output value representing the result of a multidimensional lookup of said input texture coordinate interpolated onto the surface of said target image, said texture mapping circuit comprising a coordinate translation circuit coupled to a bus, and said texture map memory, said method comprising the steps of:

receiving said input texture coordinates from an input image;

translating said input texture coordinates into texture coordinates that define an address in said texture map memory; and retrieving one or more values from said texture map memory to produce said output value.

29. The method of claim 28, wherein said texture map memory has stored therein a lookup table (LUT), said LUT contains data that includes the surface to be scanned, and said texture coordinates are used to index into said LUT.

30. The method of claim 29 wherein:

said LUT has a dimension corresponding to each of said input texture coordinates, each of said texture coordinates comprises an integer portion and a fractional part, and said step of translating includes selecting a predetermined number of bits from said input texture coordinates for said integer portion and using a remaining number of bits from said input texture coordinates for said fractional part, said predetermined number of bits based upon the size of the corresponding dimension of said LUT.

31. The method of claim 30 wherein prior to said step of translating said input texture coordinates are scaled and biased.

32. The method of claim 30 wherein said texture mapping circuit further includes an interpolation circuit coupled to said coordinate translation circuit and said step of retrieving further comprises the steps of:

said interpolation circuit selecting a texture volume within said texture map memory using said address, said address defined by the integer portions of said texture coordinates;

said interpolation circuit determining an interpolation point using said address and the fractional portions of said texture coordinates; and said interpolation circuit resampling around said interpolation point within said texture volume.

33. A computer system comprising:

a bus;

a processor coupled to said bus;

a first memory coupled to said bus having stored therein input pixel data, said input pixel data including color components;

a second memory coupled to said bus addressed in a multi-dimensional fashion having stored therein a lookup table (LUT);

a translation means, coupled to said bus, for translating said color components into an address and interpolation factors;

means, coupled to said second memory, for determining an interpolation solid in said second memory containing said address; and an interpolation means, coupled to said translation means, for performing linear interpolation within said interpolation solid using said interpolation factors, said linear interpolation resulting in an output value representing a multidimensional lookup in said LUT of one of said input pixel's color components.

34. The computer system of claim 33, wherein said first memory is a main memory and said second memory is a texture memory.

35. The computer system of claim 34, wherein said translation means separates each of said color components into an integer component and a fractional component, said integer components represent said address and are used for integer addressing said LUT and said fractional components represent said interpolation factors.

36. The computer system of claim 35, wherein each of said integer components has a variable number of bits depending upon the size of the corresponding dimension of said LUT.

37. The computer system of claim 36, wherein those of said color components that contribute to said address are scaled and biased prior to being translated by said translation means.

38. The computer system of claim 37, wherein said scaling and biasing are performed by multiplying each integer component by a scaling factor and adding a bias, wherein said scaling factor is $$\frac{size - 1}{size - 2^{-n}},$$

said bias is $2^{n-1}+0.5$, size is the size of the corresponding dimension of the LUT as stored in the texture memory, and n is the number of bits used to represent the corresponding fractional component.

39. A translation circuit configured to translate one or more pixel color components to corresponding texture coordinates for addressing a texture map memory.

40. A method of accessing a texture map memory comprising the steps of:

receiving input pixel color components;

translating the input pixel color components into texture coordinates; and retrieving one or more values from a texture map memory by addressing the texture map memory with the texture coordinates.

* * * * *